(12) United States Patent
Jauch

(10) Patent No.: US 12,259,707 B2
(45) Date of Patent: Mar. 25, 2025

(54) DEVICE FOR MONITORING THE POSITION AND/OR ATTITUDE AND/OR MOVEMENT OF A TOOL

(71) Applicant: SARISSA GMBH, Weingarten (DE)

(72) Inventor: Volker Jauch, Baienfurt (DE)

(73) Assignee: Sarissa GmbH, Weingarten (DE)

( * ) Notice: Subject to any disclaimer, the term of this patent is extended or adjusted under 35 U.S.C. 154(b) by 0 days.

(21) Appl. No.: 18/589,615

(22) Filed: Feb. 28, 2024

(65) Prior Publication Data

US 2024/0201649 A1 Jun. 20, 2024

Related U.S. Application Data

(63) Continuation of application No. PCT/EP2022/074642, filed on Sep. 5, 2022.

(30) Foreign Application Priority Data

Sep. 3, 2021 (DE) .................... 10 2021 122 889.1
Dec. 6, 2021 (DE) .................... 10 2021 132 075.5

(51) Int. Cl.
G05B 19/406 (2006.01)

(52) U.S. Cl.
CPC .................. G05B 19/406 (2013.01)

(58) Field of Classification Search
CPC .. G05B 19/406; B25H 1/0092; B25H 1/0078; B25B 21/00; B25B 23/00
See application file for complete search history.

(56) References Cited

U.S. PATENT DOCUMENTS 8,199,316 B2 6/2012 Boehm et al.
9,144,875 B2 * 9/2015 Schlesak ................ B23Q 17/22
(Continued)

FOREIGN PATENT DOCUMENTS

DE 10 2006 006 475 A1 8/2007
DE 10 2006 034 270 A1 1/2008
(Continued)

OTHER PUBLICATIONS

German Examination Report (Application No. 10 2021 122 889.1) dated May 13, 2022 (7 pages).
(Continued)

*Primary Examiner* — Catherine T. Rastovski
*Assistant Examiner* — Sharad Timilsina
(74) *Attorney, Agent, or Firm* — BURR PATENT LAW, PLLC

(57) ABSTRACT

The invention relates to a device for monitoring the position and/or location and/or movement of a tool to which an inertial sensor, such as a gyroscope sensor and/or an inertial sensor, is attached. A monitoring unit is provided in order to determine the position and/or location and/or movement of the tool on the basis of a specified starting situation using the detected sensor data. The device is characterized in that in order to calibrate the sensor(s), at least one image capturing unit is provided which is designed to capture one or more images of the tool at least at specified points in time or in intervals; an image analysis unit is provided for determining the position and/or location and/or movement of the tool; and the monitoring unit is designed to calibrate the sensor data in order to process the data.

6 Claims, 2 Drawing Sheets

(56) References Cited

U.S. PATENT DOCUMENTS

| | | |
|---|---|---|
| 9,842,254 B1 | 12/2017 | Brailovskiy et al. |
| 10,928,482 B2 | 2/2021 | Studer et al. |
| 10,940,573 B2* | 3/2021 | Shao ..................... G01S 17/88 |
| 2008/0018912 A1* | 1/2008 | Schreiber .............. G01S 19/49 342/357.32 |
| 2008/0177417 A1* | 7/2008 | Kasuga ........... G05B 19/41875 700/213 |
| 2016/0214198 A1* | 7/2016 | Hsu ..................... B23K 9/0956 |
| 2016/0215622 A1* | 7/2016 | Nelson .................. E02F 9/264 |
| 2020/0363491 A1* | 11/2020 | Studer .................... G01C 5/06 |

FOREIGN PATENT DOCUMENTS

| | | |
|---|---|---|
| DE | 20 2012 010 638 U1 | 4/2013 |
| DE | 10 2013 018 703 A1 | 5/2014 |
| EP | 1 645 921 B1 | 1/2007 |
| WO | 2011/128766 A2 | 10/2011 |
| WO | 2016/118926 A1 | 7/2016 |
| WO | 2017/093438 A1 | 6/2017 |

OTHER PUBLICATIONS

German Search Report (Application No. 10 2021 132 075.5) dated Jun. 27, 2022 (7 pages).
International Search Report and Written Opinion (Application No. PCT/EP2022/074642) dated Dec. 19, 2022 (12 pages).
International Preliminary Report on Patentability (with Chapter II Claims) (Application No. PCT/EP2022/074642) dated Aug. 23, 2023 (with English translation) (24 pages).

* cited by examiner

DEVICE FOR MONITORING THE POSITION AND/OR ATTITUDE AND/OR MOVEMENT OF A TOOL

CROSS REFERENCE TO RELATED APPLICATIONS

This application is a continuation of International Application No. PCT/EP2022/074642 filed Sep. 5, 2022, which designated the United States, and claims the benefit under 35 USC § 119 (a)-(d) of German Application No. 10 2021 122 889.1 filed Sep. 3, 2021 and German Application No. 10 2021 132 075.5 filed Dec. 6, 2021, the entireties of which are incorporated herein by reference.

FIELD OF THE INVENTION

The present invention relates to a device for monitoring the position and/or attitude and/or movement of a tool on which an inertial sensor such as a gyroscope sensor and/or an inertia sensor is mounted.

BACKGROUND OF THE INVENTION

The document WO 2011/128766 A2 describes an image capture unit as a locating device, which can also be used to calibrate a gyroscope. Other forms of locating devices, e.g. for ultrasonic location, are mentioned as an alternative to image capture.

Inertial sensors such as a gyroscope sensor and/or an inertia sensor detect dynamic parameters relating to a moving item, such as an impulse change, i.e. an acceleration, the change in rotary impulse or the like, and thereby permit the changed position and/or attitude and/or movement of the item to be determined. Since the position and/or attitude and/or movement is continued not by way of an absolute detection by an external sensor, but rather as a result of one on the basis of the most recently determined data, errors in the determination of the position and/or attitude and/or movement add up over time. To obtain the desired accuracy, such a device, therefore, needs to be regularly recalibrated. This is generally accomplished by putting the applicable item into a specified, normalized state with a known position and/or attitude and/or movement of the item.

When tools are used during the assembly of a workpiece, calibration interrupts the assembly process and results in time being lost and in the concentration of the working person being disrupted.

SUMMARY OF THE INVENTION

It is, therefore, the object of the present invention to propose such a device with improved calibration.

Accordingly, a device according to the present invention is distinguished in that besides the image capture unit there is provision for a locating device for locating the tool by way of time-of-flight measurements on wirelessly transferred signals that can be used to determine the distance between applicable transmitters and receivers. As such, the data from the inertial sensor can be regularly matched against those from the image processing, and, therefore, the inertial sensor can also be calibrated, when the tool is in the image area of the image capture unit. The inertial sensor is, therefore, always in an adequately calibrated state to deliver the desired data relating to the position and/or attitude and/or movement of the tool in the work area of the locating device operating by means of time-of-flight measurements, even outside the image capture area.

The image capture unit is preferably set up such that the envisaged workflow involves the tool being regularly taken into the image area, which means that calibration is possible without interruption during the work.

However, the present invention already affords advantages if there is provision in the workflow for the tool to be taken into the image area as a separate step, since in that case too the calibration process is much shortened compared with positioning in a defined calibration position and/or attitude, e.g. in a template or the like.

The independent locating device permits tool location in a much larger workspace compared with the field of vision of the image capture unit. These location data can then be used in combination with data from the inertial sensor to accurately determine the position and/or attitude and/or movement of the tool.

At the same time, location using this independent locating device can also be used to improve or facilitate the image evaluation of the image capture unit. If e.g. the attitude of a tool or of a sensor mounted on the tool, such as an ultrasonic transmitter, is known, the orientation of the tool in space can be determined more easily from the image perspective.

Ultrasonic transmitters and receivers allow location by way of time-of-flight measurements to be carried out very accurately. Electromagnetic signals from applicable transmitters and receivers can also be used to perform location, in particular, by way of a time-of-flight measurement.

By way of example, a device according to the present invention can be used in assistance or monitoring devices for quality assurance when assembling workpieces by means of one or more tools, in particular, a handheld tool such as a screwdriver, a drill or the like. It can also be combined with a visual or audible instruction for the various assembly steps and/or with automatic tool settings, e.g. a torque setting for a screwdriver or the like.

The present invention is particularly advantageous if the workpiece to be worked on is very large, as is the case when assembling aircraft, ships, trains or the like, for example. With such work, there are often areas that cannot be covered or cannot be completely covered using locating devices such as ultrasonic devices, which means that the use of one or more inertial sensors significantly expands the work area for monitoring the tool and adds to it in the event of combination with another locating device.

Particularly in the case of large work areas for the tool, however, calibration by way of placement in a specified calibration position is very time-consuming owing to applicable distances. The complete or extensive automation of calibration as facilitated by the invention affords a great advantage.

It is advantageous if at least one data transmission unit for the wireless or wired transmission of data/information from the inertial sensor and/or from at least one locating transmitter of the independent locating unit comprises.

These measures according to the present invention can advantageously be used to eliminate or reduce various disadvantages of the prior art.

As such, there can be provision, by way of example, for only a single locating transmitter, in particular, ultrasonic transmitter, or an LED/light source, which is advantageously combined by means of the inertial sensor for location. The data transmission unit is advantageously used for the data transmission of data from the inertial sensor and/or other data/information/parameters.

It turns out that this means that a great advantage of the combination of a single locating transmitter, for example, in the form of an ultrasonic transmitter, and an inertial sensor, preferably an inertial sensor unit, together with a wireless data transmission is a very compact or space-saving design. As such, the sensor unit on/in the tool can be implemented in a smaller form than hitherto. The locating components or the sensor unit can accordingly advantageously be integrated in/on the tool and, moreover, also protected against damage, etc.

In addition, the embodiment with an ultrasound source facilitates greater accuracy for location, in particular, the coordinate determination or so-called "geodata", than if, as hitherto customary in the trade, three ultrasonic transmitters are used or "allocated".

The advantageous data transmission unit is furthermore advantageously designed or suitable for sending data that can be used to support e.g. preventive maintenance, etc.

The data transmission unit for wireless transmission can be customized to the surroundings and, to this end, may operate in the radio and/or infrared and/or visible frequency range by means of electromagnetic waves/signals, for example.

However, the data transmission unit may also be designed for data transmission by means of ultrasound, in particular, by modulating a locating signal, and may thus use a transmitter that is present anyway.

If the data transmission unit is designed for electromagnetic transmission, it may also be used to transmit a trigger signal to start the time-of-flight measurement. To this end, there is otherwise provision for a trigger unit that is separate from the data transmission unit for the electromagnetic transmission, in particular, in the infrared frequency range, of a trigger signal to start the time-of-flight measurement. The significantly shorter time of flight of a trigger signal travelling at the speed of light means that the launch of the much slower ultrasonic signal for time-of-flight measurement can be initiated without substantial error in the time-of-flight measurement.

Wireless transfer of the trigger signal means that any sources of interference that are spatially limited can be avoided, even when the transmitters are spatially separated.

In a particular development of the present invention, the inertial sensor is in the form of an inertial sensor unit having at least one acceleration sensor for detecting a linear and/or rotational acceleration and/or having at least one rotation rate sensor for detecting a rotation speed or rotation. The inertial sensor unit or an inertial measurement unit (known as an IMU) advantageously comprises a spatial combination of multiple inertial sensors such as acceleration sensors and/or rotation rate sensors. To detect the six possible kinematic degrees of freedom, the inertial sensor unit or IMU advantageously comprises three acceleration sensors (translation sensors), each at right angles to one another, for detecting the translational movement on the x or y or z axis and/or advantageously comprises three rotation rate sensors or what are known as "gyroscopic sensors", mounted at right angles to one another, for detecting rotating (circling) movements on the x or y or z axis.

The inertial sensor unit or IMU advantageously delivers/ generates, e.g. as signals or measured values/parameters, preferably three linear acceleration values for translational movement and/or three angular velocities for rotation rates. As such, for example, in a specific application of the sensor unit, the measured values from the IMU for linear accelerations, possibly after compensation for acceleration due to gravity, can advantageously be used to ascertain, by way of integration, a linear speed and possibly, renewed integration, the position in space in relation to a reference point or coordinate system point/origin or the like. The advantageous integration of the three angular velocities delivers, in relation to a reference point, the orientation of the sensor unit and/or of the tool in space, which can advantageously be used for location or the production assistance device according to the present invention.

The inertial sensor is preferably in the form of a micro-electromechanical inertial sensor unit having at least one micro-electromechanical acceleration sensor for detecting linear and/or rotational acceleration and/or having at least one micro-electromechanical rotation rate sensor for detecting rotation speed/rotation. This allows a particularly space-saving design to be produced, thereby improving integration capability and resilience to damage, etc.

To advantageously determine the integration constants, to improve accuracy and/or to advantageously correct or adapt and/or standardize/calibrate zero-point and long-term drift in the aforementioned inertial sensors or in the position measurement system, it is advantageously possible to use e.g. additional sensors and/or measures, e.g. magnetometers or magnetic field sensors and so-called GNSS sensors integrated in the inertial sensor unit.

In principle, it is advantageous, according to the present invention, for location to be performed by means of a time-of-flight measurement between the locating sensor and the receiving unit. This is because, in general, the time of flight of the locating signal can be used to determine an exact distance between a transmitter and a receiver. When multiple paths are used, the locating can, therefore, be made more precise. Given three linearly independent paths in total, a maximum of two points remain as positions to be located, one of which can generally be ruled out by considering plausibility. As such, for example, a second theoretically possible point may systematically always be outside the range of the locating device. These considerations are based on the fact that when three distances from a locating sensor are measured, the common points of intersection of three spherical surfaces in space need to be ascertained.

This option of locating using the locating sensor or sensors that is/are present anyway also allows the correct presence of the tool in the field of vision of the image capture unit for standardization and/or calibration to be established. The image capture then allows a standardization and/or calibration position to be determined.

The sensor unit can be produced in various embodiments. One advantageous embodiment has only one ultrasonic transmitter and what is known as an IMU unit.

If the inertial sensor unit is chosen skillfully, e.g. the following performance features are advantageously covered: accelerometer, gravity, linear acceleration, gyroscope, gyroscope uncalibrated, game rotation vector, step counter, step detector, significant motion, tilt detector, pickup gesture, wake up gesture, glance gesture, activity recognition, etc.

An integrated or additional magnetometer can also be used to implement other functionalities, e.g.: geomagnetic field, magnetic field uncalibrated, orientation, rotation vector, geomagnetic rotation vector, etc.

If the inertial sensor unit is advantageously combined with the ultrasound, the ultrasonic transmitter delivers the location information by virtue of e.g. the transmitted sound waves being received by multiple receiving units and the location of the transmitter then being able to be ascertained. This location information is only one point in space (x, y, z). The information relating to the attitude (pose) and to the orientation in space of the object on which the sensor unit is mounted is advantageously obtained from the inertial sensor.

The ascertained data are preferably transmitted to the receiving unit via a radio link, e.g. by means of 5G or BLE or 4G or WLAN or a proprietary protocol in licensed frequency bands or others, and combined with the location information relating to the ultrasound. The ultrasonic transmitter may also be replaced with a light source or multiple light sources, LEDs, if necessary.

The calibration of the inertial sensor unit that needs to be performed at certain intervals of time is carried out, e.g. by way of a software command from the receiver to the transmitter, via a bidirectional radio link if the transmitter is e.g. at a defined location. The circumstance that the inertial sensor is at the calibration location can be verified by the image capture unit and/or the independent locating device.

A great advantage of the combination of an ultrasonic transmitter and an inertial sensor unit together with a radio link is the very compact design. In addition, the embodiment with a single ultrasound source will allow greater accuracy of location than if three ultrasonic transmitters are allocated.

The integrated electromagnetic transmission unit is furthermore suitable for advantageously sending data that can be used to support preventive maintenance.

BRIEF DESCRIPTION OF THE DRAWINGS

An exemplary embodiment of the present invention is shown in the drawing and is explained in more detail below with reference to the figures, in which, specifically.

DETAILED DESCRIPTION OF THE INVENTION

Figure 1:
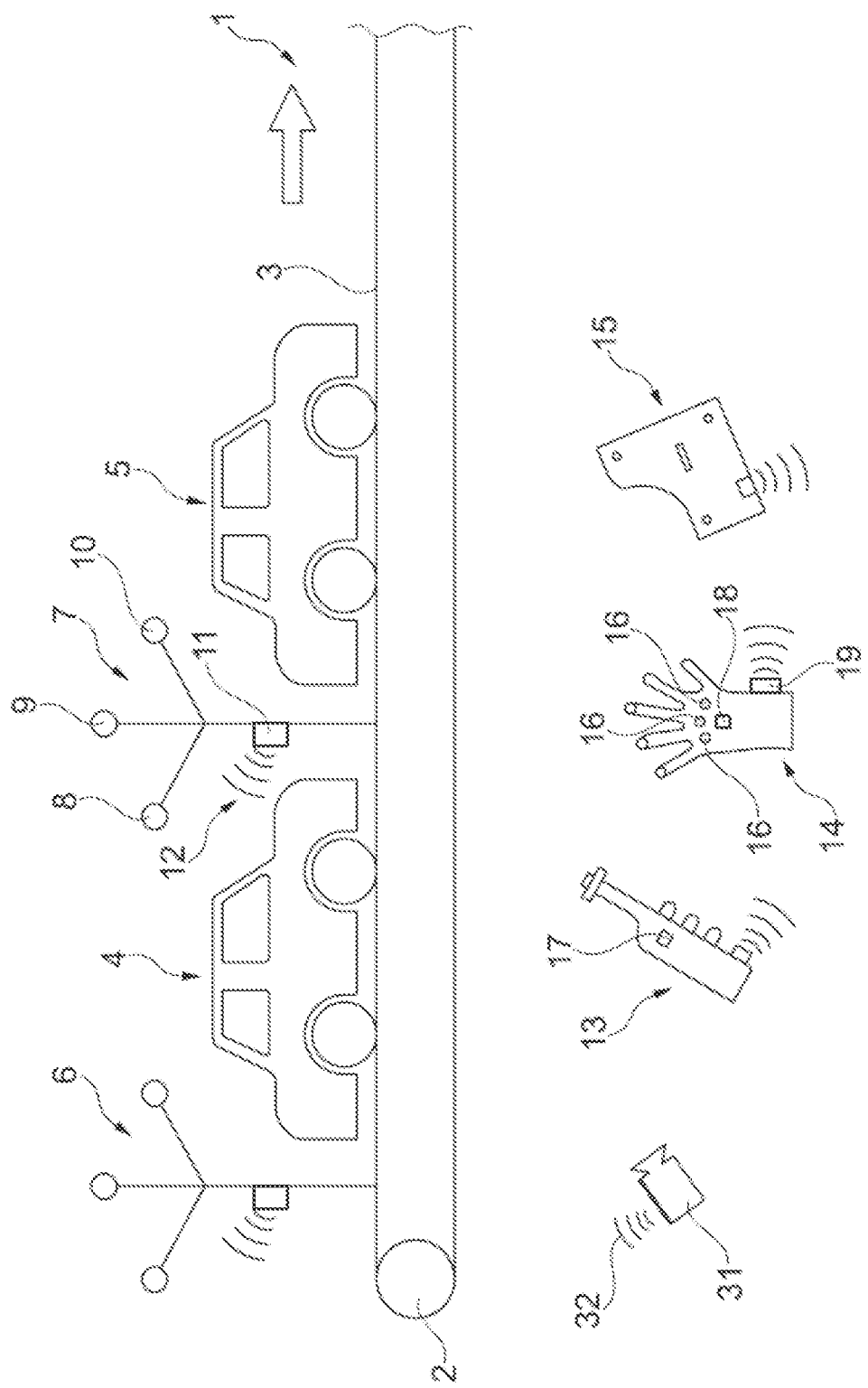
FIG. 1 shows a schematic representation of an assembly line with a device according to the present invention.

FIG. 1 schematically shows an assembly line 1 that has an upper run 3 running around a deflection roller 2. Semifinished automobiles 4, 5 are shown on the assembly line 1 as workpieces to be worked on according to the present invention.

Each of the automobiles 4, 5 or workpieces has an associated locating device 6, 7, each of which is moved along on the assembly line 1 at a fixed location in relation to the applicable workpiece 4, 5. The workpieces may alternatively also be arranged on self-propelled assembly islands.

Each locating device 6, 7 comprises three locating sensors 8, 9, 10 and a communication unit 11 for wireless communication by means of electromagnetic waves 12, for example, as a data transmission unit as mentioned above.

Three schematically represented different items to be located in the form of a screwdriver 13, a glove 14 and an assembly part 15 are each likewise provided with locating sensors 16, inertial sensors 17, 18 and a communication unit 19.

Figure 2:
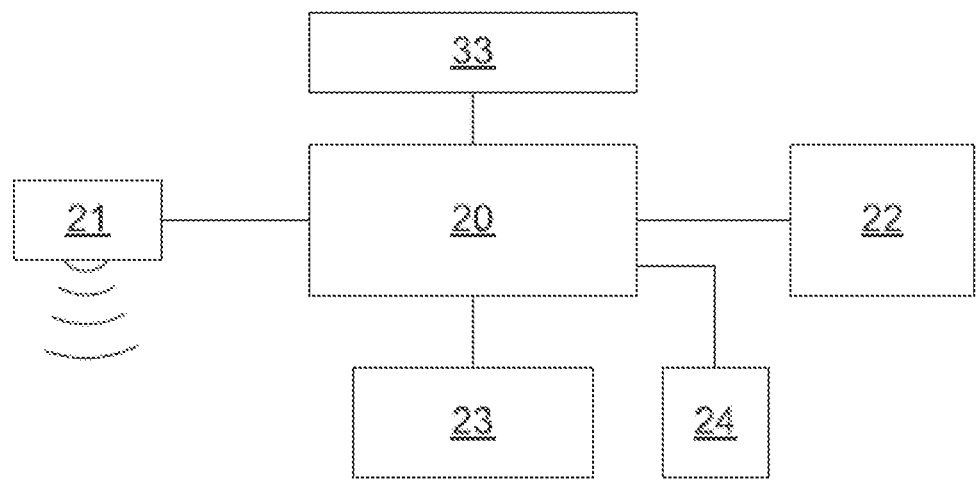
FIG. 2 shows a block diagram of a device according to the present invention.

FIG. 2 shows a central supervisory unit 20 that, by means of a communication unit 21, includes a data connection to locating devices and items to be located.

It is additionally connected to a control unit 22, a display 23 and a signal transmitter 24.

Figure 3:
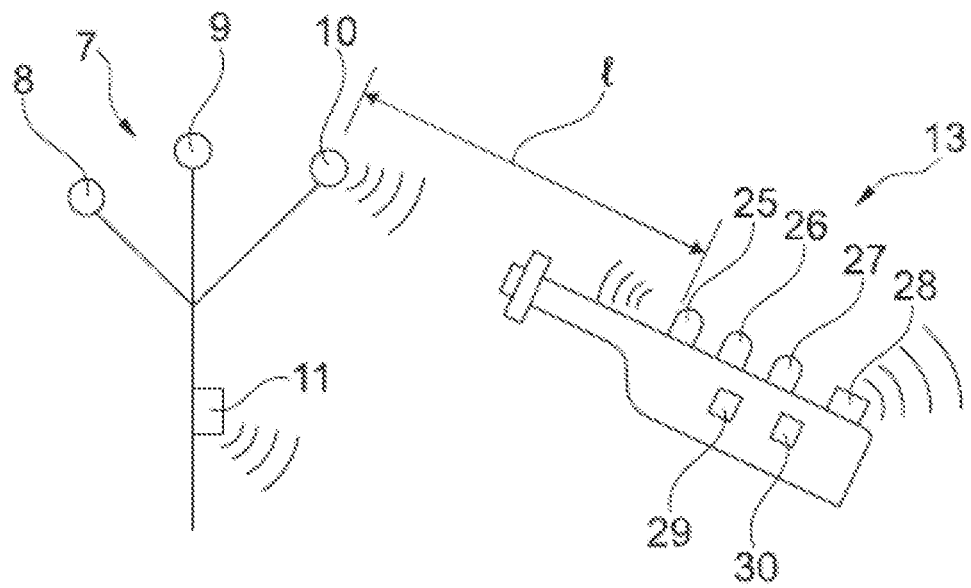
FIG. 3 shows a schematic representation of a locating device with an item to be located.

FIG. 3 shows the locating device 7 and the screwdriver 13 as an item to be located. The screwdriver 13 includes the locating sensors 25, 26, 27, a communication unit 28 and two inertial sensors 29, 30. By way of example, one of the inertial sensors 29 may be an inertia sensor for measuring impulse changes and the other inertial sensor 30 may be a gyroscope.

To calibrate the inertial sensors 29, 30, there is provision for an image capture unit, which is connected via a wireless data channel 32 to an image evaluation unit 33, which in turn communicates with the central supervisory unit 20.

As an example of the locating method, a path 1 is shown that can be used to measure the time of flight of a locating signal. As such, for example, the locating sensor 10 may be in the form of an ultrasonic transmitter and the locating sensor 25 may be in the form of an ultrasonic receiver. By way of example, one option for the time-of-flight measurement is for the central supervisory unit 20 to use the communication unit 21 to send a trigger signal to the locating device 7 and to the item to be located 13. As a result, the locating sensor 10 outputs an ultrasonic signal that, after travelling along the path 1, is detected by the locating sensor 25. In one embodiment of the present invention, receipt of the ultrasonic signal is acknowledged by way of the communication unit 28, and so the central supervisory unit 20 ascertains the time of flight. In another embodiment, the trigger signal can be used to start a clock in the locating sensor 25, and so receipt of the locating signal immediately results in the time of flight being measured and said time of flight being transferred as information by way of the communication unit 28.

In principle, location or time-of-flight measurement can also take place in a different direction, that is to say that the locating sensor 25 may be in the form of the transmitter and the locating sensor 10 may be in the form of the receiver.

In each of the variant embodiments shown, three locating sensors are mounted on the items to be located. This allows not only the position of the respective item to be located 13, 14, 15 but also the orientation thereof in space to be ascertained, which may be advantageous for the intended process monitoring. Location and determination of the orientation of an item to be located 13, 14, 15 would also be possible with only one locating sensor in combination with an inertial sensor.

As can be discerned from FIG. 1, there is provision at each workpiece 4, 5 for a locating device 6, 7 mounted at a fixed location in relation to the workpiece 4, 5. By way of location of an item to be located 13, 14, 15 and possibly the orientation of the item, the relative position of the item to be located in relation to the workpiece 4, 5 and the orientation with respect thereto are thus immediately known. It is, therefore, possible for the movements of the items to be located 13, 14, 15 in relation to the workpieces 4, 5 to be monitored by the central supervisory unit 20.

Depending on the work step to be monitored, the process support computer can receive information about the nature or type of the applicable item to be located. If required, however, an individual identification can also be carried out by way of the separate data connection. Additionally, other information, such as, for example, rotation speed, torque or the like, can also be transferred during an assembly operation. A tool detected as an item to be located can also be adjusted by the central supervisory unit 20 by way of this data connection.

Items to be located that can be put on by a member of assembly personnel, for example, the glove 14, can be used to track movements of assembly personnel. This allows the assembly movements to be monitored or the assembly personnel to be guided through the process steps that are to be performed.

Assembly parts, that is to say parts to be mounted on the workpieces 4, 5, can also be monitored as appropriate, as shown schematically using a vehicle door 15.

In one particular embodiment, the locating sensors 8, 9, 10 of the locating devices 6, 7 are equipped with transmitters for the time-of-flight signal, for example, with ultrasonic transmitters. Accordingly, the mobile items to be located 13, 14, 15 require only receivers for the time-of-flight signal. This significantly reduces the energy requirement for these mobile items. The separate data connection by way of the communication units 19 means that the items to be located can also be used with passive receiving sensors 16 for a time-of-flight measurement.

The locating devices 6, 7 arranged at fixed locations with the workpieces can be connected to larger energy stores or to a power supply grid without any problem. In principle, the separate data connection on the locating devices 6, 7 can also be made by wire to the process support computer or a similar unit having a comparable function.

It is sufficient for the flexibility of the process support device if the items to be located 13, 14, 15 are able to move freely relative to the location at which the workpieces 4, 5 are worked on.

The display 23 and the signal transmitter 24 can firstly be used to provide information about process steps performed to persons involved in the process to be monitored. A warning signal in the event of an erroneous process step can also be generated by way of these two units, for example. Process management is similarly possible by way of these units, for example, by virtue of the location of the next process step being shown or highlighted. A person who is in the process can also be audibly guided to the location of the next process step.

The image capture unit 31 is placed such that any item 13, 14, 15 to be monitored is regularly taken into the image capture area. The data from the image capture are then used to calibrate the inertial sensors 29, 30.

To this end, the image evaluation unit 33 is connected to the central supervisory unit 20, which in turn communicates with the inertial sensors 29, 30. The data processing of an inertial sensor 29, 30 can be performed in the supervisory unit or even in the sensor itself. Accordingly, the calibration then also takes place either in the central supervisory unit 20 or, following appropriate data transfer, in the applicable inertial sensor 29, 30. Data processing in the peripheral area of a network, i.e. in the present case in the sensor or sensors, is also referred to as "edge computing".

The inertial sensors mean that items to be located that are connected to the process to be monitored can be used, which do not necessarily have to be constantly connected to the respective locating device. When they leave the range of the locating device, it is possible to determine the position and/or attitude and/or movement of the tool, starting from a specified initial position, on the basis of the captured sensor data from the inertial sensors 29, 30.

Preferably, the locating device is in the form of an ultrasonic locating device for detecting the item or items to be located by means of ultrasonic waves, and/or an additional and/or separate data transmission unit for transmitting process-related actual and/or target data is in the form of a radio data transmission unit for transmitting process-related actual and/or target data by means of electromagnetic waves.

By way of example, the different times of flight of firstly ultrasonic waves and secondly (much faster) electromagnetic radio transmission or electrical data transmission by means of electrical cables or electrical wired connections and/or by means of optical data line, in particular fiber-optic cables, allow an (electromagnetic) trigger signal to be used, or, when a trigger signal is sent, the time-of-flight measurement of ultrasonic location of the locating sensor or sensors, to ascertain the distance or the exact position of the item to be located and, if need be, to process them further. If necessary, the new 5G radio standard can also be used for position finding.

Instead of the assembly line 1, there may also be provision, in another exemplary embodiment, for a large workpiece such as an aircraft in assembly, there being multiple ultrasonic transmitters and receivers of a locating device in a stationary distributed arrangement around the aircraft. One or more image capture units are then distributed over the work area such that each tool to be monitored is regularly taken into an image capture area. The data from the image capture are then used to calibrate one or more inertial sensors on the tool or tools.

To this end, an image evaluation unit, not shown in more detail, is connected to a supervisory unit for the inertial sensor or sensors, which in turn communicates with the inertial sensor or sensors. The data processing of an inertial sensor can be performed in the supervisory unit or even in the sensor itself. Accordingly, the calibration then also takes place either in the supervisory unit or, following appropriate data transfer, in the sensor.

In combination with the device for ultrasonic location shown, the position and/or attitude and/or movement of the tool can be determined by way of matching against these location data. To this end, a supervisory unit of the locating device is available in combination with the supervisory unit of the inertial sensor or sensors and/or the image evaluation unit. The image evaluation unit, and the supervisory units of the locating device and/or the supervisory unit for the inertial sensor or sensors, can also be combined into one or two supervisory units or connected to a central supervisory unit.

The data from the inertial sensors can be used in combination with the location data, for example, in order to reduce the number of locating sensors or to perform data matching. However, the invention's calibration of the inertial sensors is not limited to use in combination with a locating device according to the exemplary embodiments described.

LIST OF REFERENCE SIGNS 1 assembly line
2 deflection roller
3 upper run
4 automobile
5 automobile
6 locating device
7 locating device
8 locating sensor
9 locating sensor
10 locating sensor
11 communication unit
12 electromagnetic waves
13 screwdriver
14 glove
15 assembly part
16 locating sensor
17 inertial sensor
18 inertial sensor
19 communication unit 20 central supervisory unit
21 communication unit
22 control unit
23 display
24 signal transmitter
25 locating sensor
26 locating sensor
27 locating sensor
28 communication unit
29 inertial sensor
30 inertial sensor
31 image capture unit
32 wireless data channel
33 image evaluation unit

The invention claimed is:

1. A device that monitors a position and/or an attitude and/or a movement of a tool,
wherein the tool comprises
an inertial sensor comprising a gyroscope sensor and/or an inertia sensor mounted thereon, and
wherein the device further comprises
a supervisory unit,
at least one image capture unit, and
an image evaluation unit,
wherein the supervisory unit determines the position and/or the attitude and/or the movement of the tool, starting from a specified initial situation, based on sensor data captured from the inertial sensor,
wherein the image capture unit calibrates the inertial sensor, and the image capture unit captures one or more photographs of the tool in an image area at least at specific times or in specific time intervals,
wherein the image evaluation unit determines the position and/or the attitude and/or the movement of the tool,
wherein the supervisory unit calibrates the sensor data from the inertial sensor in order to process data from the image capture unit,
wherein the device further comprises a locating device having a single ultrasonic transmitter and an ultrasonic receiver, which determines the position and/or attitude and/or movement of the tool in combination with the inertial sensor,
wherein the locating device locates the tool by determining a distance between the single ultrasonic transmitter and the ultrasonic receiver by way of time-of-flight measurements on ultrasonic signals, the ultrasonic signals being used to determine a distance between the single ultrasonic transmitter and receiver, and
wherein the work area of the locating device operating by means of time-of-flight measurement stretches beyond the image area of the image capture unit, and there is provision for the presence of the tool in the image area of the image capture unit to be detected by the locating device in order to locate the tool by way of time-of-flight measurements on the ultrasonic signals.

2. The device as claimed in claim 1, wherein in the supervisory unit, the data from the inertial sensor are matched against the data from the image capture unit, and/or the inertial sensor is calibrated, when the tool is in the image area of the image capture unit.

3. The device as claimed in claim 1, wherein in the supervisory unit, the data from the inertial sensor are regularly matched against the data from the image capture unit, and/or the inertial sensor is calibrated, when the tool is in the image area of the image capture unit.

4. The device as claimed in claim 1, wherein the locating device further comprises electromagnetic sensors.

5. The device as claimed in claim 1, wherein the device further comprises a data transmission unit that both transmits the data from the inertial sensor, and transmits a trigger signal from the locating transmitter.

6. The device as claimed in claim 1, wherein the tool is a handheld tool selected from the group consisting of a screwdriver and a drill.

* * * * *